CROSS REFERENCE EXAMINER

458/12

Dec. 30, 1969 MASAHISA MIYAGI 3,487,169

POWER CONTROL SYSTEM FOR COMMON AMPLIFICATION OF MULTIFREQUENCY CARRIERS

Filed Sept. 10, 1965 2 Sheets-Sheet 1

J9-11-64

INVENTOR.
MASAHISA MIYAGI

BY

Hopgood & Calimafde
ATTORNEYS.

INVENTOR.
MASAHISA MIYAGI
BY
Hopgood & Calimafde
ATTORNEYS.

3,487,169
Patented Dec. 30, 1969

3,487,169

POWER CONTROL SYSTEM FOR COMMON AMPLIFICATION OF MULTIFREQUENCY CARRIERS

Masahisa Miyagi, Tokyo, Japan, assignor to Nippon Electric Company Limited, Shiba, Minatoku, Tokyo, Japan, a corporation of Japan Filed Sept. 10, 1965, Ser. No. 486,390
Claims priority, application Japan, Sept. 11, 1964, 39/51,965
Int. Cl. H04j *1/00, 3/00*
U.S. Cl. 179—15 5 Claims

ABSTRACT OF THE DISCLOSURE

The improvement in a communication network having a plurality of ground stations communicating by multifrequency carriers via a satellite repeater having a common amplifier, comprising the inserting of pilot frequency in the transmission of each station smaller in power and removed in frequency from the carriers of that station. The pilot at each station is compared with a common reference carrier emitted by the repeater and the comparison employed to control the level of the carriers of that station.

This invention relates generally to communication networks and in particular to the power control of systems where multifrequency carriers are amplified in common by a non-linear amplifier.

A detailed analysis of the amplification of multifrequency carriers by a common power amplifier whose input vs. output gain characteristic is non-linear is reported in "Analysis of Multiple Tone Clipping" by C. J. Styers which appears in the I.R.E. International Convention Record, part 8, 1961, pp. 134 through 149. The following discussion, however, will suffice to lay the groundwork for an understanding of the present invention.

In the presence of an unevenness of irregularity in the input level of the multifrequency carriers being fed to a common amplifier, the non-linearity of the input vs. output amplifier characteristic acts in such a manner that comparatively low level carriers are further reduced (relatively) and comparatively high level carriers further elevated. Thus the output carrier level irregularities become more pronounced. Since the maintenance of output level irregularities at a minimum is one of the essential criteria for optimum system performance, the foregoing result is quite disadvantageous.

Accordingly, the object of this invention is to provide a power control system which minimizes such irregularities occurring at the common amplifier.

It is a further object of this invention to satisfy the first object in such a manner that before two or more carrier signal groups each comprising at least two multifrequency carriers are applied to a common power amplifier, whose input vs. output gain characteristic is non-linear, the output levels of the multifrequency carriers contained in each of the two or more signal groups is suitably preset with a predetermined relation.

Briefly, the invention is characterized by the provision of: means for maintaining a prescribed relation for the relative levels between at least one pilot carrier provided for each carrier signal group and the multifrequency carriers contained in the carrier signal group, prior to application to a common power amplifier of this and the other carrier signal groups (each group containing at least two multifrequency carriers); means for frequency allocating the one pilot carrier signal, provided for each carrier signal group, closer to a reference carrier signal, provided in common for all carrier signal groups, than any other carrier signals contained in the carrier signal groups for ease in common attenuation or amplification of the reference carrier and the pilot carriers; and means for extracting said one pilot carrier signal provided for each carrier signal group and said one reference carrier signal provided in common for all carrier signal groups individually for the application of either carrier signal to an attenuation corresponding to the prescribed level difference of the two carrier signals so that the level of the pilot carrier may become approximately equal to that of the reference carrier, thereby controlling the input levels of all carrier signals (at least one carrier signal) contained in a carrier signal group to which the extracted pilot carrier belongs by the signal obtained from the above-mentioned level comparison.

The above-mentioned and other features and objects of this invention and the manner of attaining them will become more apparent and the invention itself will best be understood by reference to the following description of embodiment of the invention taken in conjunction with the accompanying drawings wherein.

Figure 1:
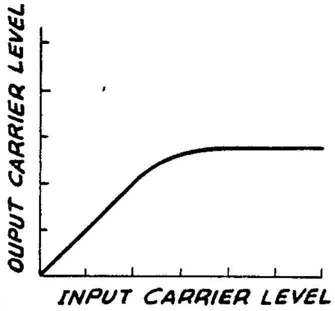
FIG. 1 shows a typical example of the input vs. output gain characteristic of a power amplifier of the type which performs the common amplification of multifrequency carriers.

FIG. 1 shows a typical example of the input vs. output gain characteristic of a power amplifier which performs the common amplification of multifrequency carriers. It will be understood that in referring to FIG. 1 the abscissa and the ordinate represent, respectively, the input carrier level and the output carrier level. As will be evident, the input vs. output gain characteristic is non-linear when the input carrier level exceeds a prescribed level. It has been common practice to operate power amplifiers at a level near such a saturated output to gain the advantage of transmission efficiency.

Figure 2:
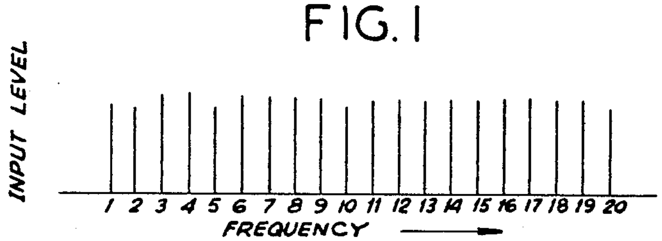
FIG. 2 shows the conventional relation between input level and frequency allocation of multifrequency carriers for common amplification.

FIG. 2 illustrates the conventional relation of input level vs. frequency allocation for multifrequency carriers to be applied to a common amplifier; the abscissa and ordinate represent, respectively, frequency and relative input level in linear scale (the numerals conveniently denote the carrier number). As may be seen, the levels of the multifrequency carriers are more or less uneven.

Figure 3:
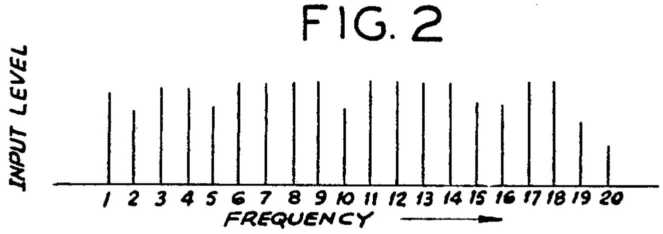
FIG. 3 shows the multifrequency carrier outputs appearing on the output side of a comon amplifier.

FIG. 3 shows a level diagram of the signals as they appear on the output side of a common amplifier whose characteristic is as shown in FIG. 1.

By comparing the level diagram of FIG. 2 with that of FIG. 3, the tendency of the higher signal level carriers becoming higher and the lower signal level carriers becoming lower will be readily apparent. In such a case, communication channels for weakened carriers are degraded in performance, with the result that the overall communication performance would suffer.

Figure 4:
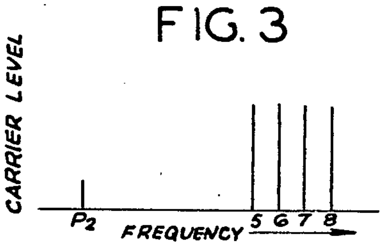
FIG. 4 illustrates the relation of the input level and frequency allocation for a particular group of input multifrequency carriers according to the invention.

FIG. 4 illustrates the relative level vs. frequency allocation for a particular group of input multifrequency carriers according to the invention. Referring to FIG. 4, P2 denotes a pilot carrier provided for the group of multifrequency carriers while 5, 6, 7 and 8 denotes, in combination, the group of multifrequency carriers. Normally, the level of the pilot carrier is taken smaller than that of any other carrier in the group to which the pilot carrier belongs to minimize the insertion power loss.

Figure 5:
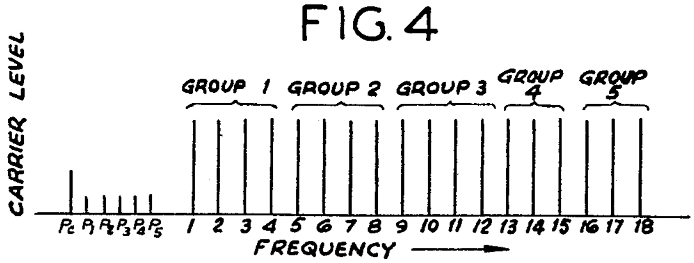
FIG. 5 illustrates the relative output level vs. frequency allocation for a plurality of multifrequency carrier groups amplified by a non-linear common amplifier according to the invention.

FIG. 5 illustrates the relation of relative output level vs. frequency allocation for a plurality of multifrequency carrier groups according to the invention. *Pc* denotes a reference carrier provided in common for all multifrequency carrier groups; $P_1$ a pilot carrier belonging to a group of carriers 1, 2, 3 and 4, $P_2$ a pilot carrier belonging to a group carriers 5, 6, 7 and 8; $P_3$ a pilot carrier belonging to a group of carriers 9, 10, 11 and 12; $P_4$ a pilot carrier belonging to a group of carriers 13, 14 and 15; and $P_5$ denotes a pilot carrier belonging to a group of carriers 16, 17 and 18.

This diagram illustrates the manner in which the pilot carrier group ($P_1$, $P_2$, $P_3$, $P_4$, and $P_5$), composed of at least one pilot carrier provided for each multi-frequency carrier group, is alloted in the passband much closer to the common reference carrier *Pc* than any other carrier groups. By frequency allocating the pilot carrier group and the reference carrier closely to each other, it becomes easier to attenuate or amplify these carriers in common prior to picking them out from the output signals. Further, a precise level comparison between a pilot carrier and the reference carrier is possible and cannot be affected by an increase or a decrease in the gain of an amplifier. In other words, effective power control can be achieved. To minimize the insertion power loss, both the pilot carriers and the reference carrier should, as mentioned, be made lower in level than the other carriers. Therefore, the bandwidths of band-pass filters for pilot carriers and the reference carrier can be made sufficiently narrow as compared with the bandwidths of other carriers. The foregoing frequency allocations are also advantageous in that the operation tends to become simple.

Figure 6:
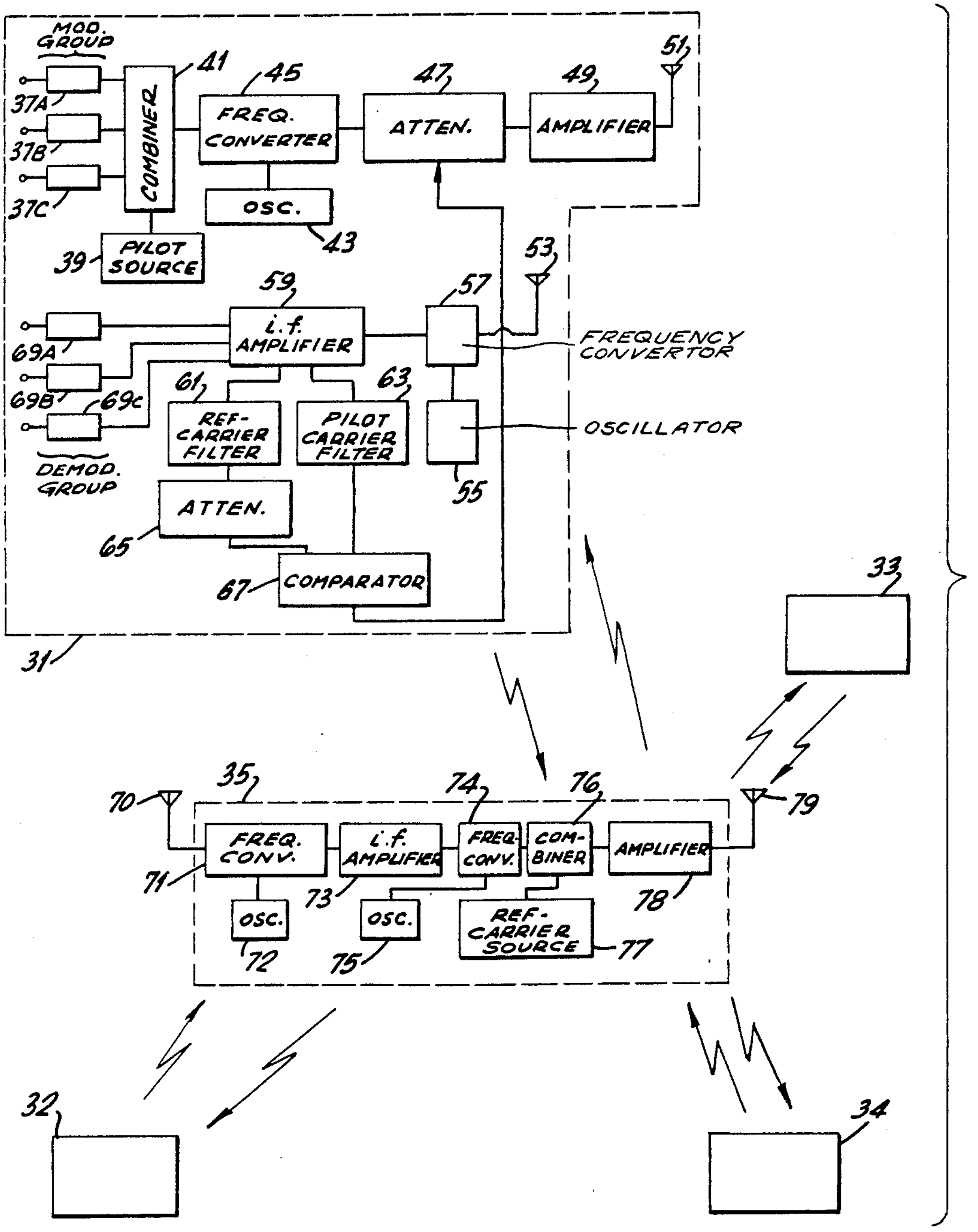
FIG. 6 shows a schematic block diagram of a communication network in which power control for the common amplification of multifrequency carriers has been provided according to the invention.

FIG. 6 schematically illustrates a commuication network according to the invention. Boxes 31, 32, 33, 34 denotes a ground-based communication facilities for mutual communications through space. Box 35 denotes a satellite repeater station for the ground-based stations. Alternatively, repeater station 35 may also be a wideband station installed atop a high mountain. Since all of the groundbased stations are similar in circuit structure, the circuitry of only one (31) has been detailed.

Referring now to ground-based station 31, elements 37A, 37B and 37C denote modulators each carrier of the multifrequency carriers individually. The modulator output and that of the pilot carrier source 39 are fed to combiner 41 for combining the pilot and multifrequency carriers of each group so as to have the level relation illustrated in FIG. 4 and for providing a prescribed relation to the levels of the multifrequency carriers of each group and the level of at least one carrier belonging to the group prior to its application to the common power amplifier.

The combiner output is fed in the conventional manner, via a frequency converter 45 and amplifier 49, to the antenna 51. An attenuator 47 is introduced in the transmitting path for a purpose to be explained. The received signal, available from antenna 53, is converted and amplified by circuits 57 and 59, and the pilot carrier and reference carrier extracted by band-pass filters 63 and 61, respectively (the intelligence being demoduated by the demodulator group 69, each carrier being demodulated individually).

Attenuator 65 equalizes the level of the pilot and reference carriers prior to their application to level comparator 67 so as to correspond to a prescribed level difference between the pilot carrier and reference carrier. The level comparator (which compares detected signals) feeds a variable attenuator 47 which is designed to reach a balanced state when the level difference between the detected signals is approximately zero.

At the repeater station 35 the multifrequency carriers received over antenna 70 are converted, amplified, and reconverted by circuits 71 through 75. The resultant signal is then combined (at 76) with a reference carrier available from source 77. The reference carrier is inserted into the passband at a level and at a frequency location where it may have a particular relation with respect to other carriers, for instance, as illustrated in FIG. 5. The combined signal is then fed to a common power amplifier 78 having the non-linear input vs. output gain characteristic illustrated in FIG. 1.

When one ground-based station receives the multifrequency carriers transmitted from a distant ground-based station and at the same time, receives both its own pilot carrier (more than one pilot may be used at each ground station) and the reference carrier emitted from the repeater station, the variable attenuator provided on the transmitting side of the local station is controlled by a signal available through the level comparison of the pilot carrier and the reference carrier such that the level relation between the reference carrier and the pilot carrier emitted from the local station is kept constant.

In such a way, all of the ground-based communication stations with which repeater station 35 is shared will be capable of controlling the transmitting power by level comparison between the reference carrier provided in common for all the ground-based stations and the pilot carrier provided for each station. As a consequence, multifrequency carriers having a predetermined level relationship are available on the output side of the non-linear common power amplifier 78, enabling stabilized communication service to be sustained.

While I have described above the principles of my invention in connection with specific apparatus, it is to be clearly understood that this description is made only by way of example and not as a limitation to the scope of my invention as set forth in the objects thereof and in the accompanying claims.

I claim:

1. In a communication network of the type having a plurality of stations each communicating with another by multifrequency carrier group transmission via a common repeater having a common amplifier, the improvement comprising means for inserting a pilot frequency in the multifrequency transmission of each station, said pilot frequency being substantially smaller in power than any other carrier in said multifrequency transmission; means at said repeater for transmitting a common reference carrier through said common amplifier; means at each station for receiving and separately extracting the local pilot and the common reference carrier from the repeater signal; comparator means at each station for comparing the level of the local pilot and reference carrier; and means responsive to said comparator means for controlling the level of all multifrequency carriers with which the extracted pilot carrier is associated.

2. The improvement claimed in claim 1, in which said responsive means comprises a variable attenuator.

3. The improvement claimed in claim 1, further comprising means disposed between said comparator means and one of said pilot and common reference carrier extracting means for setting the level of one approximately equal to the other.

4. The improvement claimed in claim 3, in which said level setting means comprises an attenuator, the value of which corresponds to a predetermined level difference.

5. The improvement claimed in claim 4, in which all of said pilots and said common reference carrier are allocated frequencies near one another and remote from the multifrequency carriers of any group.

References Cited

UNITED STATES PATENTS

| | | | |
|---|---|---|---|
| 1,658,856 | 2/1928 | Potter | 325—62 |
| 3,182,132 | 5/1965 | Barnes | 179—15 |
| 3,315,164 | 4/1967 | Ferguson et al. | 325—4 |

ROBERT L. GRIFFIN, Primary Examiner

B. V. SAFOUREK, Assistant Examiner

U.S. Cl. X.R.

325—4, 62, 65